United States Patent Office 3,353,554
Patented Nov. 21, 1967

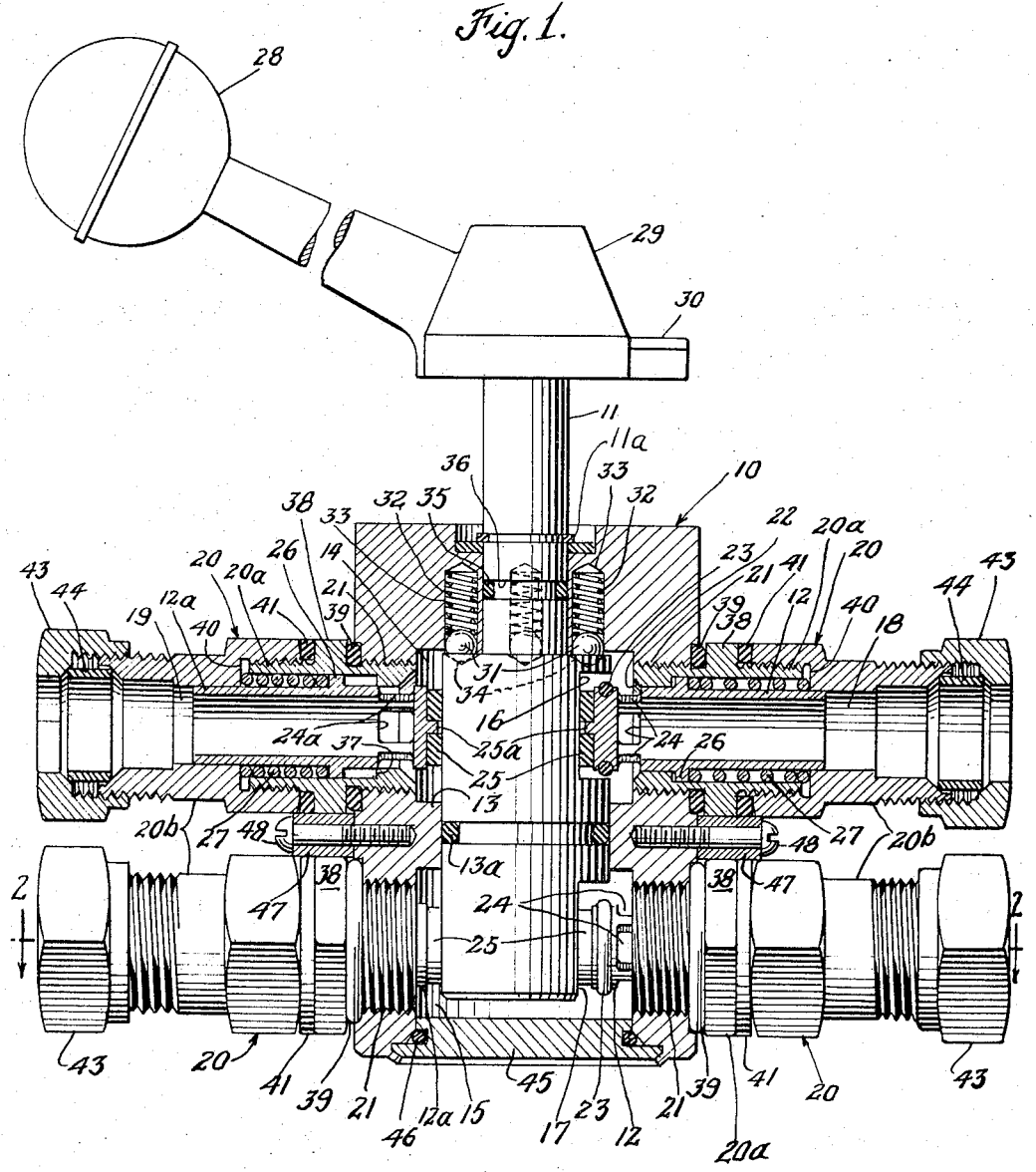

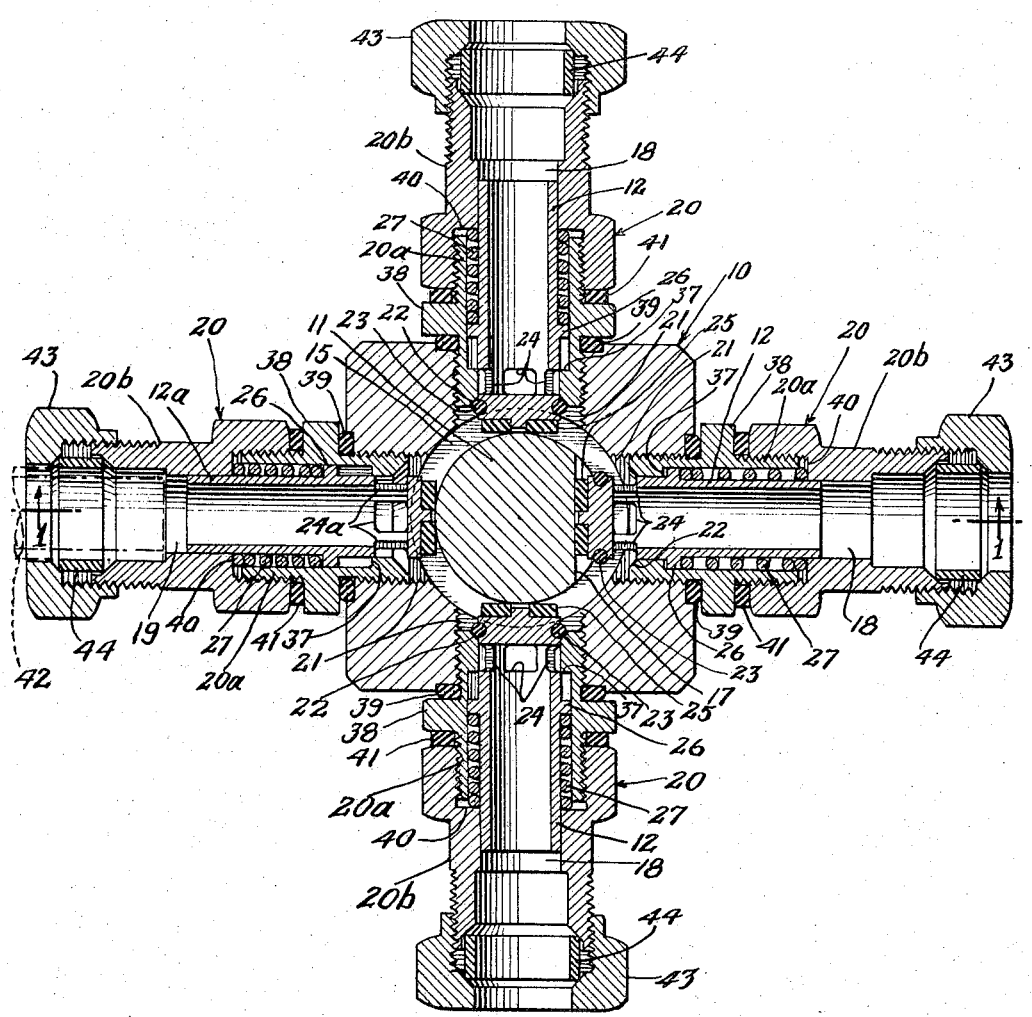

3,353,554
FLUID CONTROL VALVES
Basil A. Ludkin, Caterham, England, assignor of one-half each to Drallim Industries Limited, Upper Warlingham, England, a British company, and Angus W. Millard, Godstone, England
Filed Sept. 15, 1965, Ser. No. 487,492
9 Claims. (Cl. 137—595)

ABSTRACT OF THE DISCLOSURE

The valve of this specification is a multi-way, rotary type with a control spindle extending through a body. Positioned perpendicular to the spindle are a plurality of poppet assemblies. The movable member of an assembly is a thin walled cylinder with a resilient seal and peripheral ports adjacent its closed inner end. The movable member is supported inside a fixed sleeve having a bevelled seat at its inner end. An inwardly directed flange on the fixed sleeve and an outward flange on the movable member limits the relative inward travel. An outer sleeve having an inwardly directed abutment engages the fixed sleeve. A spring encircles the valve member between the flange and the abutment to urge it inwardly. The valve member, fixed sleeve, outer sleeve and spring, form an integral assembly connectible to the valve body as a unit. To close the valve the spindle cam surface engages the end of the movable member to urge the valve seal into engagement with the seat.

---

This invention relates to fluid-flow control valves of the kind known as selector valves and is an improvement in the invention disclosed in U.S. Patent 3,128,788 issued Apr. 14, 1964.

Valves of the type with which the present invention is concerned are comprised of a valve body having a chamber therein and a plurality of connector assemblies removably connected to the valve body to define passageways communicating with the chamber. A rotatable spindle extends through the valve body into the chamber and a cam surface is formed on the part of the spindle located in the chamber. At least one of said connector assemblies is provided with a valve seat and with a valve member disposed in the passageway for movement axially thereof. Bias means are provided for urging the valve member into engagement with the cam surface of the spindle and away from the valve seat whereby upon rotation of said spindle the valve member is movable into and out of engagement with its valve seat.

It is an object of the present invention to provide a fluid-flow control valve for selectively connecting a common conduit with a plurality of other conduits or for selectively interconnecting conduits of a series, wherein each valve member is constructed so as to provide improved flow characteristics and to minimize the pressure drop across the valve.

Another object of the invention is to provide a more direct connection between the passageways and the valve chamber with the object of eliminating radially extending pockets of fluid with respect to said chamber when the valve member is closed. This improved construction reduces the volume of the valve chamber without reducing the effective flow area through the chamber.

Besides providing improved flow between the valve channel and the main chamber, it is a further object to provide better flow characteristics through the main valve chamber because of the elimination of eddy forming pockets. This elimination of the radial pockets further reduces the volume of the main chamber to allow more effective purging of the chamber. This is an important improvement particularly when the valve is used for such purposes as sampling or mixing operations.

A further object of the invention is the provision of sub-assemblies of valve parts ready for mounting into position in the port of a valve body, thus permitting rapid final assembly of any selected combination of valve and dummy valve parts.

It is also an object of the invention to retain a positive sealing action in the valve assemblies while supplying the improved asembly relationships. The positive closing is supplied by applied closing forces rather than spring loaded sealing.

How these and other objects and advantages are attained will be clear from the following description of the drawings in which:

FIGURE 1 is a sectional elevation taken in the direction of arrows 1—1, FIGURE 2, through a rotary selector valve according to the present invention.

FIGURE 2 is a sectional view taken in the direction of arrows 2—2, FIGURE 1, showing the relationship of the individual valve assemblies.

Referring to the drawing, there is shown a selector valve suitable for selectively connecting in each of two banks of pipes, a common inlet pipe with each of three outlet pipes. The selector valve comprises a valve body 10 into which extends an operating spindle or stem 11 which is rotatable to actuate the valve members 12 for opening and closing the connections to the outlet pipes. A central cavity is formed in the valve body, which cavity is divided by an annular shoulder 13 to form two valve chambers 14 and 15.

The lower part of the spindle 11 is located within the cavity and is formed with axial flats or cam surfaces 16 and 17 in the chambers. A seal is maintained between the two chambers by means of an O ring 13a located in a suitable groove in the lower portion of the spindle 11 and engaging the annular sholulder 13.

Communicating with each of the valve chambers 14 and 15 are three outlet passages 18 and a common inlet passage 19, these passageways being arranged radially with respect to the spindle axis of the valve body. The radial passageways in each bank are defined by removable connector assemblies 20 regularly spaced around the valve body 10. Each connector assembly incorporates an inner portion 20a which is provided with a valve seat 22 and is screwed into a port 21 in the valve body. The outer portion 20b of the assembly 20 is in turn threaded to the inner portion 20a. Engageable with the conical valve seat 22 is an annular sealing member 23 which is supported near the inner end of the valve member 12. It will be noted that each valve member 12 is in the form of a sleeve which is open at the outer end and closed at the inner end. The inner end is formed with an annular recess or groove to support the sealing member 23 which may be in the form of an O ring. Closely adjacent to the closed end of the valve member 12 and radially outward from the sealing member 23, ports 24 are formed in the wall of the cylindrical valve member 12. A replaceable bearing disc 25 is located on a short spigot 25a at the inner end of each valve member 12 and bears directly on the surface of the spindle 11.

One of the connectors 20 defines an inlet passageway 19 which houses a dummy valve member 12a which is in the form of a sleeve generally similar to valve member 12, and which is open at the outer end and closed at the other. Sleeve 12a, however, has radial ports 24a which are of such an area that they are always in communication with the valve chamber with which it is associated.

Each sleeve 12 and 12a has an exterior radial projection or flange 26 against which a compression spring 27 located within the connector assembly bears to urge the valve member 12 or 12a inwardly against the spindle 11. The interposed bearing disc 25 serves to reduce the friction and wear at the point between the spindle 11 and the valve member 12. Thus the particular valve member 12 or 12a which is in engagement with an axial flat 16 or 17 of the spindle, shown to the right in the figures, is urged inwardly by its spring 27 so that its passageway 18 is open. The other three valve members in each bank are held outwardly by the spindle 11. The valve members 12 have their sealing members 23 engaging the valve seats 22 to close the corresponding passageways 18. Passageway 19, however, remains open in this position because of the fact that the ports 24a are proportioned to lead into the valve chamber and there is no seal associated with the closed end of the dummy valve member 12a.

A handle or knob 28 is shown secured to the upper end of the spindle 11 by means of a cap 29 which is shaped to provide a pointer 30 to indicate which of the passageways is open while the spring urged valve members 12, 12a act on the flats of the spindle 11 to assist in properly locating the handle in any desired position. More accurate indexing elements may be included if desired. As shown in FIGURE 1, equally spaced steel balls 31 are provided which are urged downwardly by springs 32 located in vertical bores 33 in the upper portion of the valve body 10. Bores 33 are located opposite shallow conical cavities 34 formed in the upper end of the large diameter portion of spindle 11. Thus when spindle 11 is rotated, the balls 31 are forced upwardly out of one set of cavities 34 and dropped into the next set of cavities to accurately position the spindle at the next valve position. It will be noted that O ring 35 in spindle groove 36 provides a seal between the valve body and the spindle. A snap ring 11a may be used to retain spindle 11 in proper axial position.

It should be noted that each valve connector assembly may be attached to or removed from the valve body 10 as a complete sub-assembly. Thus the inner portion 20a includes an inward flange 37 near the inner end. This flange provides a limit stop against which the inner sleeve flange 26 is retained before the sub-assembly is mounted in position in the body 10. In addition, the connector member 20a is supplied with an outwardly directed flange 38 which may have flats upon it to assist in screwing the complete assembly 20 into position in the valve body. A sealing member 39 is located between the flange 38 and the valve body 10. Likewise the outer connector member 20b incorporates an abutment 40, against which the spring 27 reacts. Further a sealing member 41 is positioned between the inner and outer members 20a, 20b of the connector assembly 20.

At the outer end of portion 20b of the connector assembly, provision is made for connecting a pipe or tube 42 shown in broken outline in FIGURE 2. A threaded cap member 43 provides for applying pressure to a cylindrical resilient sleeve 44, which is deformed by the screwing on of threaded cap 43 to tightly grip the tube 42 and retain and seal it.

In the valve construction shown in FIGURE 1, the lower end of valve body 10 is provided with a disc or plug 45 arranged to be riveted in position to retain a sealing ring 46 thus closing the lower end the cavity to enclose the chamber 15.

In operation of the selector valve, the handle and spindle are turned so that the spindle cam surface 16 or 17 is aligned with the channel through which flow is to occur. Thus in the figures, the cam surfaces are in alignment with the channels or outlets shown on the right and consequently these connector valve assemblies are in the open position. With the cam surface in the position shown, the spring 27 urges the valve member 12 inwardly against the cam surface thus permitting the seal 23 to move away from its seat 22 and allow flow through the ports 24 between the passages 18 and the chambers 14 and 15. Thus flow is permitted between the open dummy valve 12a or channel 19 and the opposite channel 18. As will be noted in FIGURE 2, the other two outlet channels 18 are closed inasmuch as the spindle 11 is holding the valve member 12 in its radially outward position where the sealing member 23 is held firmly against the seat 22, and thus effectively prevents flow between the passages 18 of such valves and the chamber 14 or 15. Thus when the flat cam surface of the spindle is moved into alignment with the inner end of any given valve member 12, this member is open to allow flow. If desired to close all three passages in the bank of passageways, the spindle is turned so that the cam portion is engaging the inlet valve member 12a. Since passageway 19 is then the only one open no flow will occur.

To retain the connector assemblies 20 in position after they have been inserted and adjusted, a block 47 is inserted against the flats of flanges 38 and block 47 held in place by screw 48 which screws into a tapped hole in valve body 10.

It will be evident that, while passageway 19 has been designated as the inlet and passageways 18 as outlets, the flow may be reversed and multiple supply sources may be selectively connected to a single outlet.

It will be evident that the valve improvements of the present invention are equally applicable to valves having a single bank or more than two banks, and that it is also applicable to valves in which each bank may have fewer than four valve port assemblies or more than four.

It will be noted that the depth of the flats on the spindle 11 is such as to give the valve members the necessary movement to effect full opening and complete closing of the passages. It will also be noted that it is not necessary that the cam surfaces in adjacent banks be in alignment, but may be arranged, if desired, to have the passageway in one bank open at a different position than the passageway in an adjacent bank.

With the connector assembly arrangement of the present invention, the complete sub-assembly of the connector parts may be made remote from the valve body proper. Thus the valve sub-assembly and the dummy valve sub-assemblies may be maintained in stock in assemblied form and a custom assembly made using the valve body with the parts arranged to suit the particular needs of the valve requirement in hand. Alternatively, a valve may be readily changed to provide a different arrangement of dummy assemblies and valve assemblies to suit a different application. The intergral sub-assembly with its sliding sleeve and seal located at the inner end of the assembly next to the valve chamber provides an arrangement in which increased flow and decreased pressure drop across the valve parts are obtained. With this valve construction, excess valve chamber volume is eliminated with resultant improvement in flow characteristics and the elimination of excess chamber volume which might be detrimental in cases where purging operations are necessary or measuring operations of different fluids. These improved features are attained while retaining the desirable positive closing action where the closed position of the valve seals is accurately determined by the spindle surface.

I claim:
1. A multiple port control valve having
   (a) a main body,
   (b) a valve stem rotatably supported in said body with a cylindrical annular chamber around said stem,
   (c) a plurality of valve connection assemblies radially disposed in said body with their axes perpendicular to said valve stem, one of said assemblies having
      (1) a fixed cylindrical sleeve with an inward flange and a bevelled seat at the inner end,
      (2) an axially movable sleeve mounted inside said cylindrical sleeve having an external annular flange, an inner closed end with an annular groove around it, an annular port connecting the inside of said movable sleeve and the annular chamber at a point adjacent said inner end, (3) a resilient seal supported in said groove, (4) a spring member reacting against the flange of said movable sleeve to urge the external annular flange toward the inward flange of said fixed sleeve, (d) said valve stem having a flattened cam surface which may be rotated into alignment with said axially movable sleeve to allow said sleeve to move into open position with its end against said cam surface and said seal being remote from said seat so that the annular port connects said cylindrical annular chamber of said valve body to the hollow inner portion of said movable sleeve, said valve stem being rotatable to a position where the end of said movable sleeve is contacted by the cylindrical portion of said valve stem to urge said movable sleeve to closed position with the resilient seal engaged against said bevelled seat.

2. A multiple port valve having
(a) a main body having a cylindrical chamber,
(b) a cylindrical valve stem supported in said body having its axis coincidental with the the axis of said chamber and having a depressed cam surface on the cylindrical stem,
(c) a plurality of valve port assemblies radially disposed in said body with the axes of said assemblies located in a plane perpendicular to the axis of said valve stem,
(d) one of said port assemblies having
(1) a fixed sleeve member having a threaded portion at its inner end engaging with said body, a threaded portion at its outer end and an external flange between said threaded portions, the inner end having a thickened wall forming an inward shoulder and a bevelled seat,
(2) a movable hollow sleeve member supported on said fixed sleeve member and having an annular flange, said movable sleeve member having a closed inner end with an annular groove therein, a resilient seal supported in said groove and engageable with the inner end of said fixed sleeve when said movable sleeve member is moved radially outwardly, said movable sleeve having a peripheral port located radially outwardly from said groove and radially inwardly from said flange,
(3) an outer sleeve member in threaded engagement with the outer end of said fixed sleeve member, said outer sleeve member having an inwardly directed annular abutment and means for connecting a delivery tube,
(4) a compression spring reacting between said abutment and the annular flange of said movable sleeve to urge the movable sleeve radially inwardly when aligned with the cam surface of said valve stem.

3. A valve construction in accordance with claim 2 in which at least one port assembly incorporates a different movable hollow sleeve member having an annular flange, said different movable sleeve having a closed inner end and having a port in the peripheral wall adjacent to the inner end, said port being proportioned to connect the inside of said hollow sleeve member with said main body chamber for all positions of said different movable member.

4. A control valve having
(a) a main body with a cylindrical shaped chamber therein,
(b) a valve stem rotatable supported in said body and having its axis coincidental with the axis of said chamber with an annular space around said stem,
(c) a plurality of integral valve connector assemblies radially disposed around said body with the axes of said assemblies perpendiucular to said valve stem, each of said assemblies having
(1) a passageway extending radially from the chamber in said body, and having a bevelled seat at the inner end of said passageway adjacent said chamber,
(2) a slidable valve member mounted in said passageway, said valve member being in the form of a cylindrical sleeve open at its radially outer end and closed at its inner end and having an annular port in its periphery adjacent its closed end, said closed end having a bearing element supported on it,
(3) a resilient sealing member supported on the closed end portion of said sleeve and being engageable with said bevelled seat, to close the connection between said passageway and said chamber,
(4) a compression spring reacting against said sleeve to urge it inwardly,
(d) said valve stem having a cylindrical surface engagement with the inner end of said sleeve to move it to a radially outer position with the sealing member in closed position, said valve stem further having a flattened cam surface which may be rotated into position adjacent the inner end of said sleeve to permit it to move axially inwardly under the influence of said spring to a position where said sealing member is spaced from said seat to allow said port to form an open connection between the chamber of said valve body and said passageway.

5. A valve construction according to claim 4 which includes
(a) a further valve connector assembly having,
(1) a passageway extending radially from the chamber in said body,
(2) a different slidable valve member in said passageway in the form of a cylindrical sleeve open at its outer end and closed at its inner end and having an annular port in the peripheral wall adjacent its closed end, the proportions of said port and said inner end providing a fluid flow connection between said chamber and said passageway for any position to which said different valve member is moved under the rotation of said stem.

6. A multiple port valve having
(a) a main body having a cylindrical chamber,
(b) a plurality of valve connector assemblies radially disposed in a plane around said body with their axes perpendicular to the axis of said cylindrical chamber, each of said connector assemblies having
(1) a fixed sleeve member having a threaded portion at its inner end engaging with said body, a threaded portion at its outer end, an external flange between said threaded portions, an inside shoulder forming a thickened section at the inner end of said sleeve member and a peripheral bevel thereon,
(2) a movable hollow sleeve member supported on said fixed sleeve member, said hollow sleeve member having a closed inner end with an annular external groove therein, an open outer end, an external annular flange, a port in the wall of said hollow sleeve member near the inner closed end inwardly from said flange and outwardly from said groove,
(3) an outer sleeve member having its inner end in threaded engagement with the outer threaded portion of said fixed sleeve member, said outer sleeve member having an inward annular abutment and means for connecting a delivery tube at its outer end,
(4) a sealing member supported in the groove of said hollow sleeve member engageable with the bevel of said fixed sleeve member when the sleeve is in its outer position, (5) a compression spring reacting between the external flange of said movable hollow sleeve member and the inward annular abutment of said outer sleeve member to urge said movable sleeve member inwardly, (c) a valve stem supported in said body having its axis coincidental with the axis of the cylindrical chamber, and said valve stem having a cylindrical surface smaller than said chamber to form an annular space therebetween, said valve stem having a flattened cam surface in one portion of its cylindrical surface, the inner ends of said movable hollow sleeve members being movable to an outer closed position when engaging the cylindrical surface portion of said valve stem and to an inner open position when the end of said movable sleeve member is aligned with the flattened cam surface portion of said valve stem.

7. A valve construction according to claim 6 in which there is a valve connector assembly having a different movable hollow sleeve member having a closed inner end, an open outer end, an external annular flange, a port in the wall near said inner end proportioned to connect the inside of said sleeve member to said annular space both when the different sleeve member is in its radially outer position or when it is in its radially inner position.

8. A multiple port valve having
(a) a main body having a cylindrical chamber,
(b) a plurality of valve connector assemblies radially disposed in a plane around said body with their axes perpendicular to the axis of said cylindrical chamber,
(c) a second bank of connector assemblies radially disposed in a second plane axially displaced with respect to the first mentioned plane,
(d) a plurality of connector assemblies in each plane having,
  (1) a fixed sleeve member having a threaded portion at its inner end engaging with said body, a threaded portion at its outer end, an external flange between said threaded portions with a resilient seal in contact with each side of said flange, an inside shoulder forming a thickened section at the inner end of said sleeve member and a peripheral bevel thereon,
  (2) a movable hollow sleeve member supported on said fixed sleeve member, said hollow sleeve member having a closed inner end with an annular external groove therein, an open outer end, an external annular flange, a port in the wall of said hollow sleeve member near the inner closed end inwardly from said flange and outwardly from said groove,
  (3) an outer sleeve member having its inner end in threaded engagement with the outer threaded portion of said fixed sleeve member, said outer sleeve member having an inward annular abutment and means for connecting a delivery tube at its outer end,
  (4) a sealing member supported in the groove of said hollow sleeve member engageable with the bevel of said fixed sleeve member when the sleeve is in its outer position,
  (5) a compression spring reacting between the external flange of said movable hollow sleeve member and the inward annular abutment of said outer sleeve member to urge said movable sleeve member inwardly,
(e) a valve stem supported in said body having its axis coincidental with the axis of said chamber, said valve stem having an end portion extending through the body of said chamber,
  (1) a groove around said end portion of said stem and a groove around said valve stem at a point between the banks of connector assemblies,
  (2) a sealing ring in each of said grooves,
(f) and a lock block positioned between the external flange of a fixed sleeve in the first bank of connector assemblies and the external flange of a fixed sleeve in the second bank.

9. A valve construction according to claim 8 in which there is a valve connector assembly which has a different movable hollow sleeve member having a closed inner end, an open outer end, an external annular flange, a port in the wall near said inner end proportioned to connect the inside of said sleeve member to said annular space both when the different sleeve member is in its radially outer position or when it is in its radially inner position.

References Cited
UNITED STATES PATENTS

| | | | |
|---|---|---|---|
| 2,691,990 | 10/1954 | Ashton et al. | 251—261 X |
| 2,846,845 | 8/1958 | Parker | 137—625.26 X |
| 3,128,788 | 4/1964 | Millard | 137—595 |

M. CARY NELSON, *Primary Examiner.*

HENRY T. KLINKSIEK, *Examiner.*